United States Patent [19]

Barraud et al.

[11] Patent Number: 4,598,056

[45] Date of Patent: Jul. 1, 1986

[54] MATERIAL CONTAINING MICROAGGREGATES OF METALS, INORGANIC COMPOUNDS OR ORGANOMETALLIC COMPOUNDS, MORE PARTICULARLY USABLE IN HETEROGENEOUS CATALYSIS AND ITS PRODUCTION PROCESS

[75] Inventors: André Barraud, Bures-sur-Yvette; Jean Leloup, Gif sur Yvette; Annie Ruaudel, Verriéres le Buisson, all of France

[73] Assignee: Commissariat a l'Energie Atomique, Paris, France

[21] Appl. No.: 680,354

[22] Filed: Dec. 11, 1984

[30] Foreign Application Priority Data

Dec. 12, 1983 [FR] France ............................. 83 19841

[51] Int. Cl.$^4$ .............................................. B01J 35/02
[52] U.S. Cl. ........................................ 502/4; 502/101; 502/527
[58] Field of Search ............................. 502/4, 101, 527

[56] References Cited

U.S. PATENT DOCUMENTS 3,392,103  7/1968  Berger ...................................... 502/4
4,132,668  1/1979  Gryaznov et al. ....................... 502/4

FOREIGN PATENT DOCUMENTS 1800380  5/1969  Fed. Rep. of Germany .
1595890  6/1970  France .
2130465  11/1972  France .
1200595  7/1970  United Kingdom .

OTHER PUBLICATIONS

Chemical Abstracts, vol. 31, No. 21, 10/11/37, Col. 7760, lines 1-11, Columbus, Ohio, USA.
Revue de l'Institut Francais du Petrole, vol. 27, No. 1, Jan./Feb. 1972, pp. 105-154.

*Primary Examiner*—W. J. Shine
*Attorney, Agent, or Firm*—Michael N. Meller

[57] ABSTRACT

The material comprises a membrane constituted either by at least one monomolecular layer of amphiphilic molecules, or by amphiphilic molecules adsorbed on a substrate, and microaggregates of the metal, inorganic compound or organometallic compound retained on or in the membrane. It is prepared from a membrane containing a metal ion or a precursor compound of said metal, inorganic compound or organometallic compound, by reacting the ion or precursor compound fixed in the membrane with at least one reagent for forming the metal, inorganic compound or organometallic compound in situ in the membrane. For example, the membrane can be constituted by monomolecular layers of behenic acid, which is then converted into silver behenate by contacting with a silver nitrate solution. Silver microaggregates are then formed in the membrane by reducing the silver behenate by means of hydrazine.

25 Claims, 7 Drawing Figures

⊢10NM⊣

MATERIAL CONTAINING MICROAGGREGATES OF METALS, INORGANIC COMPOUNDS OR ORGANOMETALLIC COMPOUNDS, MORE PARTICULARLY USABLE IN HETEROGENEOUS CATALYSIS AND ITS PRODUCTION PROCESS

BACKGROUND OF THE INVENTION

The present invention relates to a material containing microaggregates of metals, organometallic compounds or inorganic compounds more particularly usable in heterogeneous catalysis and to its production process.

More specifically, the invention relates to the production of materials containing microaggregates having near-molecular dimensions and which are distributed in the material so as to form an organized structure and which consequently has novel properties and in particular a high reactivity.

For some years, attempts have been made to reduce the size of the aggregates of mineral or organometallic compounds used as the catalyst in heterogeneous catalysis because this makes it possible to increase the efficiency of the reactions, due to the increase in the available interface. In order to obtain mineral or organometallic compounds in the form of microaggregates, processes have been developed using matrixes preventing the diffusion and consequently the aggregation of compounds.

Among these processes, a process using an inert gas matrix is known consisting of mixing a metal vapor with an inert gas, then cooling the mixture to a very low temperature to obtain a solid matrix of the inert gas in which the metal is included in the form of atoms or microaggregates (cf J. Chem. Phys. 70,12,15.6.79, pp. 5683–5691).

Thus, this process makes it possible to obtain microaggregates having a size of at the most 100 Å, but these microaggregates are not stable as soon as the solid matrix is eliminated by raising the temperature.

Another process is known, which uses ionizing radiation to ionize a solvent containing in solution a metal salt, so as to bring about the in situ reaction of the solvated electrons obtained by ionization with the molecules of the metal salt. In this process, the subsequent aggregation of the metal particles is prevented by dispersing a soluble polymer in the solution and this prevents the diffusion of the species. It is also possible to produce platinum, iridium, rhodium, ruthenium and copper catalysts with an average particle size diameter of approximately 10 Å (cf Nouveau Journal de Chimie, Vol. 6, No. 11, 1982, pp. 507–509). However, this process does not make it possible to accurately check the size of the microaggregates formed.

SUMMARY OF THE INVENTION

The present invention relates to a material having microaggregates of metals, organometallic compounds or inorganic compounds, in which said microaggregates have substantially molecular dimensions and are distributed in an ordered manner in a solid matrix and are immobilized by the latter.

The material according to the invention comprises a membrane constituted by either at least one monomolecular layer of amphiphilic molecules, or by amphiphilic molecules adsorbed on a substrate and microaggregates of organometallic or inorganic compounds retained on or in said membrane.

According to an advantageous feature of the invention, the membrane is formed by a stack of monomolecular layers of amphiphilic molecules, e.g. acids, such as fatty acids, complexes or complexing agents, such as platinum chlorides complexed with alkyl amines, alkyl pyridines or alkyl pyridinium.

Advantageously, the microaggregates are microaggregates of a metal, e.g. a noble metal such as silver, palladium or platinum.

The microaggregates can also be constituted by a metal compound, e.g. a halide, oxide or chalcogenide (sulphide, selenide or telluride).

The invention also relates to a process for producing a membrane containing microaggregates of a metal, an inorganic compound or organometallic compound and which comprises the following stages:

1. preparing a membrane constituted either by at least one monomolecular layer of amphiphilic molecules, or by amphiphilic molecules adsorbed by a substrate containing an ion or a precursor compound of said inorganic compound or organometallic compound; and 2. reacting the ion or precursor compound fixed to the membrane with at least one reagent to form in situ in the membrane the metal, inorganic compound or organometallic compound.

According to a first embodiment of the process according to the invention, the first stage is performed by firstly preparing a membrane from amphiphilic molecules incorporating groups having a chemical or physical affinity for the ion or precursor compound of said metal inorganic compound or organometallic compound and then by contacting the thus obtained membrane with a solution of the ion or precursor compound, so as to fix the ion or precursor compound to the sites of the membrane corresponding to said groups.

Thus, the process according to the invention consists of utilizing the organization and rigidity of a solid matrix constituted either by at least one monomolecular layer of amphiphilic molecules or by amphiphilic molecules adsorbed on a substrate, in order to fix and immobilize an ion or precursor compound and then limit the growth of the grains or aggregates during the chemical reaction between the ion or precursor compound and the reagents necessary for the formation of the metal, inorganic compound or organometallic compound.

Thus, on using a membrane constituted by a stack of monomolecular layers of amphiphilic molecules an organized solid matrix is obtained and it is possible to fix the ion or precursor compound at clearly defined points of the structure in the form of monomolecular layers of organic amphiphilic molecules.

It is pointed out that amphiphilic molecules are organic molecules having on the one hand hydrophilic groups, or groups with an affinity for water, and on the other hand hydrophobic groups or groups having no affinity for water.

Examples of such compounds are fatty acid molecules, whose carboxylic groups constitute hydrophilic groups, whilst the hydrocarbon chain at the other end of the molecule forms the hydrophobic group.

The use of such compounds is particularly advantageous, because they can be deposited in the form of monomolecular layers with an organized structure by using the Langmuir-Blodgett method. According to this method, the amphiphilic molecules are dispersed on a liquid constituted by water. Due to the presence of hydrophilic and hydrophobic groups, the molecules are oriented on the surface of the water in such a way that their hydrophilic group is immersed in the water, whilst the remainder of the molecule can move away from the same. When the spreading of these molecules on the surface of the water is limited to a monomolecular film, it is then possible to deposit this film on a substrate and, during deposition, the molecules of the film will retain their orientation so that the hydrophilic ends are all in one plane and the hydrophobic ends are all in the opposite plane of the film. Thus, when a membrane is produced having a plurality of monomolecular layers deposited on a substrate, hydrophilic planes and hydrophobic planes occur in alternating manner.

Microaggregates of metals, inorganic compounds or organometallic compounds can then be fixed at the desired points within this structure, i.e. in the case of metal ions in the hydrophilic planes of the matrix.

When the molecules forming the membrane incorporate groups with a physical affinity relative to the ion or precursor compound, the latter is fixed by physisorption and it is possible to check the quantity of ions or precursor compound introduced into the membrane, by appropriately regulating the ion or precursor compound concentration of the solution and the duration and temperature used for contacting the membrane with the solution.

However, when the molecules forming the membrane incorporate groups with a chemical affinity for the ion or precursor compound, the latter is then stoichiometrically fixed to specific sites of the membrane and this gives aggregates which can have a molecular size. Thus, on using e.g. a membrane with acid groups and a precursor compound constituted by a metal salt, the metal cation is fixed to the acid groups of the membrane and during the subsequent reactions, it is possible to obtain microaggregates with the size of a molecule.

In the case where the membrane is constituted by a stack of monomolecular layers of amphiphilic molecules, the metal cations are fixed in the hydrophilic planes of the matrix and during the subsequent reactions, microaggregates of mineral compounds are obtained, e.g. of metals or metallic compounds, such as sulphides or halides with the size of a molecule or dimensions less than 10 Å. Through limiting the size of the microaggregates distributed in the matrix to such small dimensions, it is possible to obtain improved properties, e.g. a far superior catalytic activity in the case of metals with catalytic properties or improved fluorescence, semiconductivity and/or luminescence properties in the case of microaggregates formed from mineral compounds with such properties.

Thus, the process according to the invention makes it possible to obtain a solid matrix with an organized structure having alternately hydrophilic and hydrophobic planes and molecules of mineral compounds synthesized in situ between the different layers and organized in two-dimensional form in space, without being attached to the monomolecular layer matrix. It is thus possible to obtain microaggregates with molecular dimensions distributed in the hydrophilic plane and separated from one another by a matrix with a thickness of e.g. 50 Å. The microaggregates are not distributed in a random manner in these intercalated planes and also in fact have an organized structure as a result of the position of the hydrophilic groups of molecules constituting the monomolecular layer. This makes it possible to give the system different properties, particularly reactivity compared with an identical system in which the microaggregates were distributed in a random manner.

Moreover, the matrix has a crystalline structure, whereas in the case of most prior art products use was more particularly made of porous, amorphous, polymer structures, producing catalysts, which did not make it possible to protect the catalytically active metal distributed in the matrix. However, in the invention, the compact organic matrix protects the catalytically active metal against poisoning problems because only gases can diffuse in said compact structure and they throw back to the outside impurities or poisons of sizes greater than 4 Å.

According to a second embodiment of the process according to the invention, the first stage is performed by preparing the membrane from molecules containing said ion or precursor compound. This embodiment can in particular be used when it is wished to fix a metal cation in the membrane. In this case, the molecules used for preparing the membrane can be molecules of the corresponding metal salt, e.g. a metal salt of a fatty acid. In the latter case, use is made of the structure and organization of the solid matrix constituted by the metal salt, in order to obtain metal cations at the desired points during subsequent reactions.

Thus, the process according to the invention makes it possible to accurately control the size and dimensions of these microaggregates.

Moreover, it has the advantage of permitting the production of microaggregates with a very varied constitution. Thus, for example, it is possible to fix a metal cation to the membrane and then release the metal by reacting the cation with a reducing agent. It is also possible to form different metal salts in the membrane by then introducing reagents constituted by acids or salts containing the desired anion, e.g. sulphides, phosphides, halides, cyanides, thiocyanates, etc. It is also possible to successively perform different reactions in the membrane to obtain the desired compound.

According to a preferred embodiment of the process according to the invention, the membrane is formed from monomolecular layers of amphiphilic organic molecules.

According to the invention, it is also possible to use amphiphilic membranes formed from natural or artificial biological molecules, such as membranes of phospholipids provided with proteins, which also have a good structural organization.

The membrane can also be formed by a substrate constituted e.g. of alumina, on which are adsorbed amphiphilic molecules having properties differing from those of the substrate. In the case of such adsorbed layers, the hydrophobic - hydrophilic alternation may be in the alternation between the substrate and the adsorbed molecules and not in the amphiphilic nature of the actual molecule. Thus, the surface of the substrate can serve as the hydrophilic plane and the adsorbed molecule the function of the hydrophobic region. Conversely, the surface of the substrate can act as the hydrophobic plane and the molecule as the hydrophilic region. For example, a membrane of this type can be constituted by stearic acid molecules absorbed onto an alumina substrate.

According to the invention, the molecules forming the membrane are chosen as a function of the metal, inorganic compound or organometallic compound to be formed. Thus, when it is wished to form metal or metal salt microaggregates, it is possible to use molecules with acid functions, because the latter are able to fix most metal cations.

However, if it is wished to form microaggregates of noble metals which do not react with the acid functions, it is then possible to use a membrane in which the molecules are able to complex a soluble salt of these metals.

As examples of molecules which are usable in the latter case, reference can be made to organic molecules containing nitrile or amine groups able to stoichiometrically complex platinum chloride. It is also possible to use molecules having acetylene functions, because the latter are able to react with ions such as silver, copper and mercury.

When the membrane is formed from monomolecular layers of amphiphilic molecules, it is also possible to use amphiphilic molecules having ethylene functions and then irradiate the group of layers with ionizing rays in order to bond the layers together by polymerization at the ethylene functions. It is also possible to use monomolecular layers formed from different molecules and to optionally then perform polycondensation reactions between the different molecules.

The process according to the invention is advantageously applied to the production of metal or metal salt-based microaggregates. In this case, it is possible to use a membrane formed from monomolecular layers of molecules of fatty acid, e.g. behenic, stearic, omega-tricosenoic or arachic acids. The acid is then converted into the corresponding metal salt by reacting with an appropriate precursor compound constituted e.g. by a metal salt, such as a silver salt or a copper salt. The corresponding metal salt can also be directly used for producing the membrane.

The reactions which then take place in the membrane will either be a reduction reaction if it is wished to form metal microaggregates, or an exchange with the appropriate reagent, e.g. an acid or another metal salt when it is wished to form microaggregates of metal compounds.

In the first case, the reagents used are reducing agents such as hydrazine, thiocarboxyhydrazine or ferrous iron. In the second case, use will be made of reagents constituted e.g. by hydrochloric acid, hydrobromic acid or hydrogen sulphide $H_2S$.

The product obtained by the process according to the invention is constituted by a solid membrane within which are distributed microaggregates of a metal, an inorganic compound or organometallic compound. Thus, the product can be used in certain applications, e.g. catalysis, because the presence of the organized matrix makes it possible to prevent recrystallization of the microaggregates and to protect the latter against certain undesirable chemical species.

When the product obtained by the process of the invention is transparent and comprises metal microaggregates, e.g. constituted by silver grains, it is possible to use this product for the study of molecules by reinforced Raman spectrometry by placing the molecules to be studied on the product containing the silver micrograins, which makes it possible to obtain a sensitivity gain of $10^3$ to $10^5$ due to charge transfers between the molecules and the micrograins.

For other applications, it is sometimes preferable to eliminate the solid matrix, in order to release the microaggregates or to deposit them on the substrate acting as a support for the membrane. In this case, the process according to the invention comprises a complementary stage consisting of selectively dissolving the membrane, so as to release the microaggregates of inorganic or organometallic compounds. With this objective, use is made of an organic solvent able to dissolve solely the molecules forming the membrane.

BRIEF DESCRIPTION OF THE DRAWINGS

The invention is described in greater detail hereinafter relative to a number of non-limitative examples and with reference to the attached drawings, wherein show.

EXAMPLE 1

Using the Langmuir-Blodgett method, 25 monomolecular layers of behenic acid are placed on a $3\times 1$ cm $CaF_2$ transparent substrate using a $10^{-3}$ mol.l$^{-1}$ behenic acid solution in chloroform for carrying out the deposit. Using infrared spectrophotometry, a check is made to ensure that the behenic acid deposited on the fluorine substrate is obtained in its current structure, because characteristics of form b are found, which represent the resolution of the $CH_2$ band at 1470 cm$^{-1}$ and the presence of progression bands at 1300–1180 cm$^{-1}$.

The behenic acid is then converted into silver behenate by immersing the coated substrate in an aqueous solution containing $10^{-2}$ mol.l$^{-1}$ of silver nitrate at 20° C. for 15 minutes. This is followed by rinsing with distilled water and drying in air.

Figure 1:
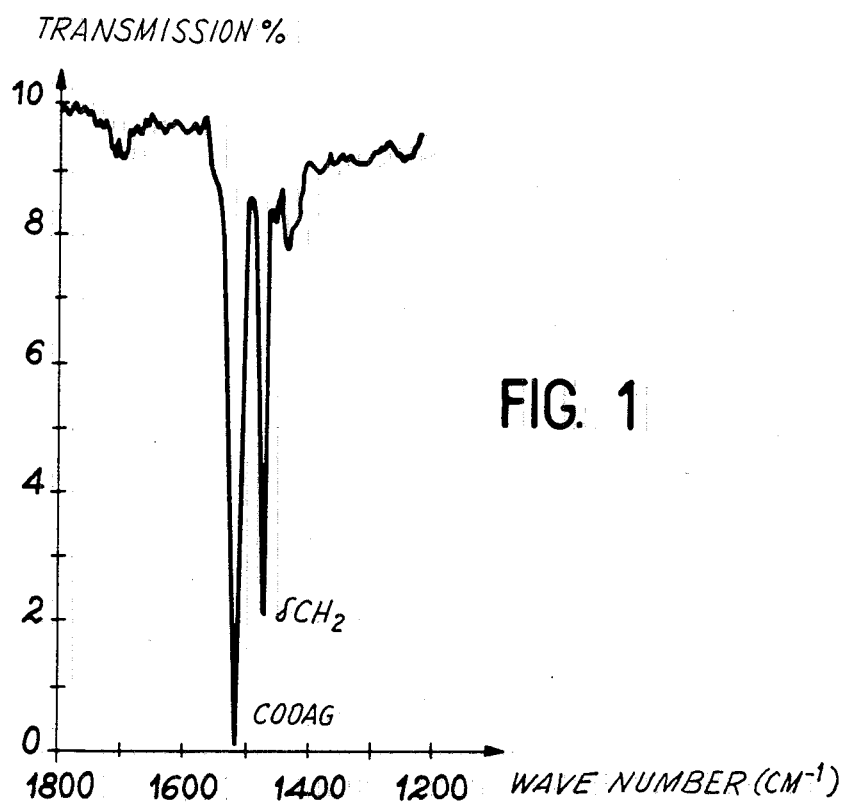
FIG. 1 the infrared spectrum of the silver salt obtained by reacting silver nitrate with a stack of monomolecular layers of behenic acid.

The structure of the product obtained is checked by infrared spectrometry, the infrared absorption spectrum being shown in FIG. 1 and it is characteristic of the silver salt. Thus, the band $\nu_C=0$ at 1708 cm$^{-1}$ of the acid has completely disappeared to the benefit of the band $\nu_{coo}-$ of the salt at 1517 cm$^{-1}$. The band $\delta CH_2$ at 1470 cm$^{-1}$ is no longer resolved. Thus, the crystalline system has changed but the organization in layer form is retained.

The silver behenate is then reduced very carefully by hydrazine vapors in order to form roughly nm microaggregates in the behenic acid monomolecular layer structure. For this purpose, use is made of hydrazine vapors at 20° C., diluted in a nitrogen stream. The silver behenate-coated substrate is contacted with these diluted vapors for several minutes. The substrate becomes violet. By slow hydrolysis in the air, the behenic acid is regenerated. This is checked by infrared spectrometry, which indicates that behenic acid is obtained in a different crystalline system from that of the initial acid. Thus, the band $\delta CH_2$ at 1470 cm$^{-1}$ is not revolved and there are no progression bands. Thus, it is the infrequently encountered form a which is obtained and this is very close to the structure of the silver salt. Thus, at this stage, there has been no movement in the matrix. The energy of the reaction is not adequate to modify the structure and permit the stabilization of an unstable form of the behenic acid. The thus obtained microaggregates are characterized by electron microscopic, electron diffraction and UV spectroscopy in the visible range.

Figure 2:
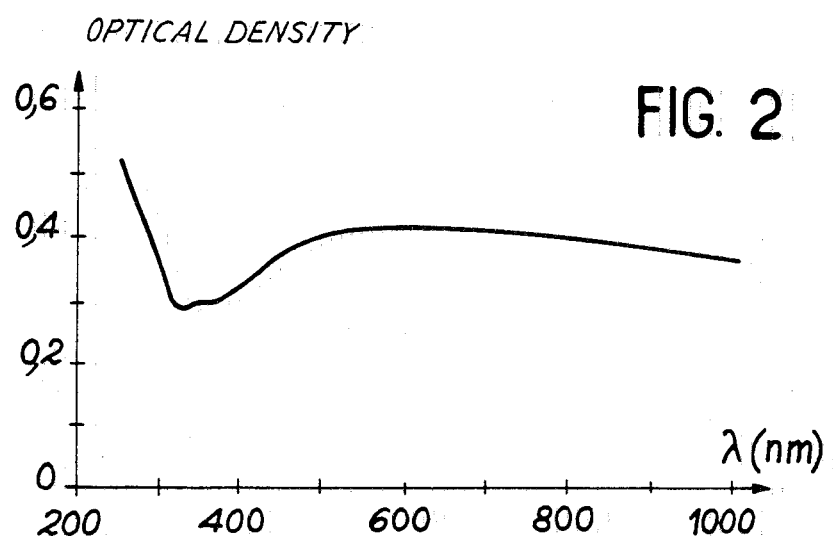
FIG. 2 the spectrum in the visible range corresponding to the microaggregates obtained in Example 1.

The spectrum in the visible range shown in FIG. 2 indicates the existence of an absorption band with an optical density maximum at approximately 600 nm. This gives the impression that there are still conductive grains, but the considerable width of the adsorption band indicates a lower conductivity of the grains than for the metallic silver. This can correspond either to more or less conductive, non-stoichiometric silver compounds, or to a reduction in the metallic conductivity caused by a wall effect due to the small size of the grains.

Figure 3:
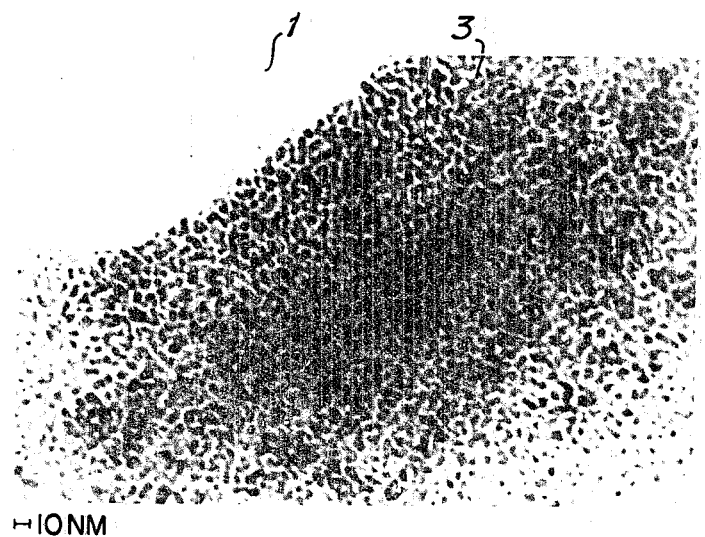
FIG. 3 a micrograph representing the microaggregates obtained in Example 1.

FIG. 3 is a micrograph obtained by electron microscopy. It is possible to see that the substrate 1 contains regularly distributed, very small grains 3 with a size less than 20 Å, i.e. at the resolution limit of the apparatus. The electron diffraction spectrum shown in FIG. 4 corresponds to no known spectrum of silver compounds (silver-metal, oxide, nitrate, etc).

EXAMPLE 2

In the same way as in Example 1, a substrate coated with 25 monomolecular layers of behenic acid is prepared and this behenic acid is converted into silver behenate under the same conditions as those of Example 1. This is followed by a reduction of the salt by using concentrated hydrazine vapors. This is brought about by leaving the coated substrate over a 98% hydrazine hydrate solution for a few minutes. In this way, a reduction of the silver behenate is obtained and the product is transformed into monomolecular layers of behenic acid stabilized in the a form, as in Example 1 and which contains silver microaggregates.

The properties of the product obtained are checked by spectrometry in the visible range, electron microscopy and electron diffraction, as in Example 1.

Figure 5:
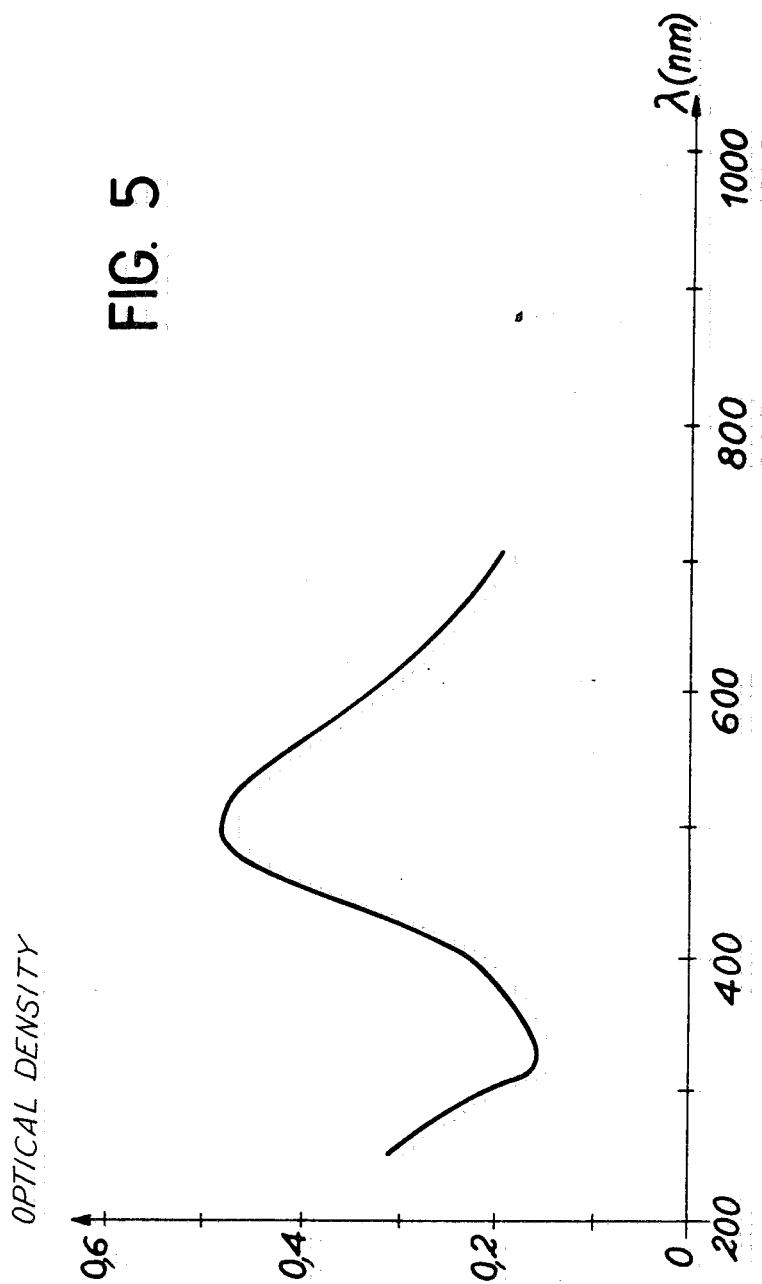
FIG. 5 the spectrum in the visible range of the microaggregates obtained in Example 2.
Figure 6:
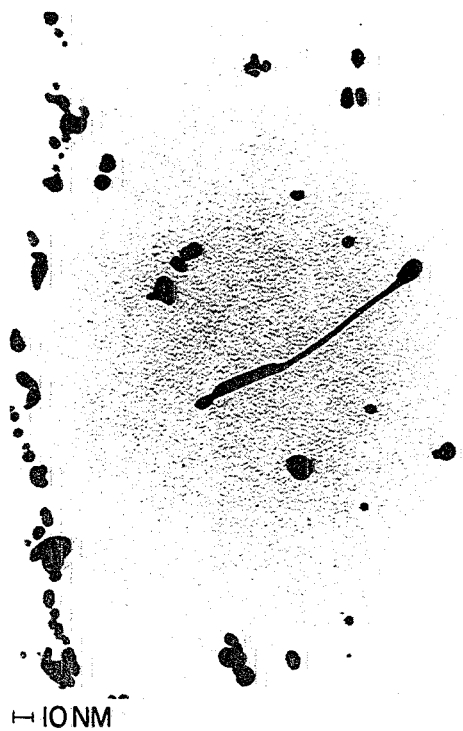
FIG. 6 the microaggregates obtained in Example 2.

FIG. 5 shows the optical spectrum and it is possible to see an optical density maximum between 400 and 500 nm with a width of approximately 200 nm, which corresponds to the spectrum of silver.

Figure 4:
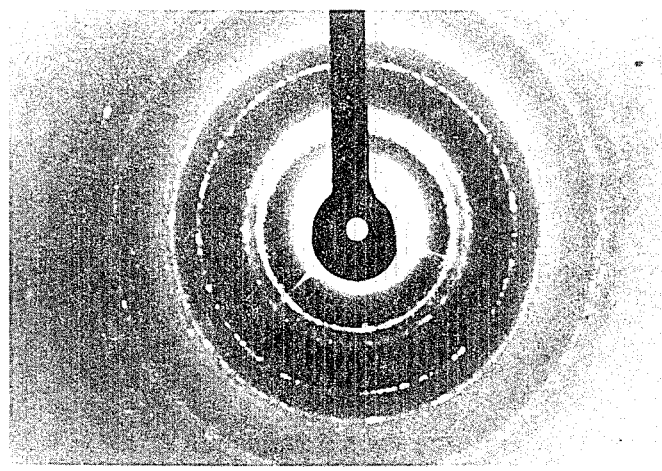
FIG. 4 the electron diffraction spectrum of the microaggregates obtained in Example 1.

FIG. 4 shows in electron microscopy the microaggregates obtained and it can be seen that they have dimensions greater than those of the microaggregates of Example 1, because they are irregularly distributed aggregates of average size between 300 and 500 Å.

Figure 7:
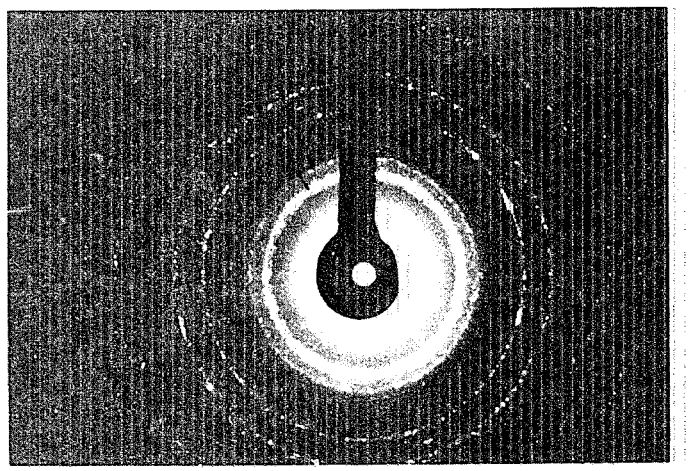
FIG. 7 the electron diffraction spectrum of the microaggregates of FIG. 6.

The electron diffraction spectrum shown in FIG. 7 is that of metallic silver. Thus, on using a hydrazine excess, the metallic silver formed in situ is able to migrate into the structure and to e.g. accumulate on defects, thus giving rise to larger aggregates no longer having molecular dimensions.

Conversely, without the hydrazine excess, the solid structure of the monomolecular layers maintain the silver atoms in place and make it possible to obtain small regularly distributed grains having dimensions substantially corresponding to those of the silver molecules.

EXAMPLE 3

Using the Langmuir-Blodgett method, 11 monomolecular layers of silver behenate deposited on a collodion substrate are prepared and subjected to the action of hydrobromic acid vapors at 20° C. This leads to silver bromide microprecipitates, which are characterized by their electron diffraction spectrum.

EXAMPLE 4

As in Example 1, 11 monomolecular layers of behenic acid deposited on a quartz substrate are prepared and they are converted into silver behenate by contacting with an aqueous $10^{-2}$ mol.$l^{-1}$ silver nitrate solution at 20° C. The assembly is then subject to the action of hydrochloric acid vapors and this gives a precipitate of silver chloride micrograins. On then diffusing a hydroxylamine solution at pH=8, the silver chloride is reduced to metallic silver and the silver microaggregates obtained in this way are characterized by their spectrum in the visible range.

EXAMPLE 5

As in Example 1, 31 layers of omega-tricosenoic acid are prepared on a fluorine substrate, followed by the polymerization of the layers by irradiating with ionizing rays with a dose of 100 mJ/cm$^2$. The assembly is then subject to the action of an aqueous $10^{-2}$ mol.$l^{-1}$ copper chloride solution at 20° C. This gives the polyomega-tricosenoic copper salt and this copper salt is then reduced into metal form by the action of an aqueous ferrous iron solution.

EXAMPLE 6

As in Example 1, 31 layers of behenic acid deposited on a fluorine substrate are prepared and they are then contacted for 20 minutes with an aqueous $10^{-2}$ mol.$l^{-1}$ palladium chloride (II) solution. Under these conditions, no palladium salt forms, which is checked by infrared spectrophotometry. However, the palladium chloride is retained between the monomolecular layers by physisorption. As a result of the action of a carbon monoxide stream, palladium black microaggregates are precipitated in situ.

EXAMPLE 7

Using the Langmuir-Blodgett method, 31 layers of 2,4-diylidyne-pentacosanoic acid are prepared on a fluorine substrate. An aqueous $10^{-1}$ mol.$l^{-1}$ cupric chloride solution is then diffused into the layers, which leads to the formation of an unstable copper salt. A cupric oxide precipitate is obtained through the action of pyridine vapors.

EXAMPLE 8

Using the Langmuir-Blodgett method, 99 monomolecular cadmium stearate layers deposited on a glass substrate are prepared. The substrate with the 99 monomolecular layers is then subject to the action of hydrogen sulphide and in this way yellow cadmium sulphide microaggregates are obtained.

EXAMPLE 9

Using the Langmuir-Blodgett method, 99 monomolecular layers of zinc arachidate deposited on a glass substrate are prepared. As hereinbefore, hydrogen sulphide is allowed to act on the thus coated substrate, giving yellow zinc sulphide microprecipitates.

EXAMPLE 10

Using the Langmuir-Blodgett method, 131 monomolecular layers of zinc tetrapyridyl-porphyrin are prepared having four $C_{20}$ chains complexed by pyridine (established spectroscopically). The sample is subject to the action of hydrochloric acid vapors. This operation releases the $Zn^{++}$ cation (established spectroscopically) which remains confined in the layers.

EXAMPLE 11

Use is made of a membrane formed by a polylysine layer, on which is deposited a behenic acid layer. The thus obtained membrane is then contacted with an ammoniacal solution containing $10^{-1}$ mol.l$^{-1}$ of silver nitrate. The silver salt is then reduced into metal by contacting the membrane with thiocarboxyhydrazine. This gives metallic silver microaggregates.

EXAMPLE 12

A membrane is prepared by adsorbing stearic acid on an alumina substrate by contacting the alumina substrate with a $10^{-2}$ mol.l$^{-1}$ stearic acid solution in chloroform. The thus obtained membrane is then contacted with an aqueous solution containing $10^{-2}$ mol.l$^{-1}$ of nickel chloride, so as to fix the nickel to stearic acid molecules. This is followed by the in situ precipitation of the black nickel sulphide by diffusing gaseous hydrogen sulphide into the membrane.

What is claimed is:

1. A material incorporating microaggregates of a metal, an inorganic or organometallic compound, wherein it comprises a membrane constituted by either at least one monomolecular layer of organic amphiphilic molecules having both hydrophilic and hydrophobic groups, or by said organic amphiphilic molecules adsorbed on a substrate; and microaggregates of a metal, an inorganic compound or an organometallic compound retained on or in said membrane.

2. A material according to claim 1, wherein the membrane is constituted by a stack of monomolecular layers of amphiphilic molecules.

3. A material according to claim 1, wherein the amphiphilic molecules are amphiphilic complexing agents for metals, metal complexes or acids.

4. A material according to claim 3, wherein the acids are fatty acids.

5. A material according to claim 1, wherein the microaggregates are microaggregates of a metal.

6. A material according to claim 5, wherein the metal is chosen from the group of noble metals.

7. A material according to claim 1, wherein the microaggregates are microaggregates of a metallic compound.

8. A material according to claim 7, wherein the metallic compound is selected from the group consisting of halides, chalcogenides and oxides.

9. A process for producing a membrane containing microaggregates of a metal, an inorganic compound or an organometallic compound and which comprises the following stages:

(1) preparing a membrane constituted either by at least one monomolecular layer of organic amphiphilic molecules having both hydrophilic and hydrophobic groups, or by said organic amphiphilic molecules adsorbed on a substrate containing a metal ion or a precursor compound of said metal, inorganic compound or organometallic compound; and (2) reacting the ion or precursor compound fixed to the membrane with at least one reagent to form in situ in the membrane the metal, inorganic compound or organometallic compound.

10. A process according to claim 9, wherein the first stage is performed by firstly preparing a membrane from amphiphilic molecules in incorporating groups having a chemical or physical affinity for the ion or precursor compound of said metal, inorganic compound or organometallic compound and then by contacting the thus obtained membrane with a solution of the ion or precursor compound, so as to fix the ion or precursor compound to the sites of the membrane corresponding to said groups.

11. A process according to claim 9, wherein the first stage is performed by preparing the membrane from amphiphilic molecules containing said ion or precursor compound.

12. A process according to claim 9, wherein the membrane is constituted by monomolecular layers of amphiphilic molecules.

13. A process according to claim 9, wherein the membrane is constituted by amphiphilic molecules adsorbed on a substrate.

14. A process according to claim 9, wherein the molecules constituting the membrane are biological molecules.

15. A process according to claim 12, wherein the amphiphilic molecules are molecules of a fatty acid.

16. A process according to claim 9, wherein the reagent is a reducing agent.

17. A process according to claim 9, wherein the reagent is $H_2S$.

18. A process for the preparation of microaggregates of a metal, an inorganic compound or organometallic compound, wherein it consists of preparing a membrane having microaggregates of the metal, inorganic compound or organometallic compound by performing the process according to claim 9, then selectively dissolving the membrane so as to release the microaggregates of metal, inorganic compound or organometallic compound formed in the membrane.

19. The material according to claim 1, wherein the metal is selected from the group consisting of silver, copper, palladium and platinum.

20. The material according to claim 1, wherein the inorganic compound is selected from the group consisting of metal halides, oxides, sulphides, selenides and tellurides.

21. The material according to claim 20, wherein the inorganic compounds are selected from the group consisting of silver chloride, silver bromide, copper oxide and the sulphides of cadmium, zinc and nickel.

22. The material according to claim 1, wherein the substrate is selected from the group consisting of calcium fluoride, collodion, quartz, glass, polylysine and alumina.

23. The material according to claim 3, wherein the complexing agents for metals are organic molecules containing nitrile or amine groups.

24. The material according to claim 4, wherein the fatty acids are selected from the group consisting of behenic, stearic, ω-tricosenoic, arachic, and 2,4-diylidyne-pentacosanoic acids.

25. The material according to claim 14, wherein the biological molecules are phospholipids.

* * * * *